(12) United States Patent
Tupakula et al.

(10) Patent No.: US 11,797,590 B2
(45) Date of Patent: Oct. 24, 2023

(54) GENERATING STRUCTURED DATA FOR RICH EXPERIENCES FROM UNSTRUCTURED DATA STREAMS

(71) Applicant: Microsoft Technology Licensing, LLC, Redmond, WA (US)

(72) Inventors: Pranathi R. Tupakula, Seattle, WA (US); Aman Singhal, Bellevue, WA (US); Prithvishankar Srinivasan, Seattle, WA (US); Marcelo M. Debarros, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 27 days.

(21) Appl. No.: 17/141,634

(22) Filed: Jan. 5, 2021

(65) Prior Publication Data
US 2022/0067077 A1 Mar. 3, 2022

Related U.S. Application Data

(60) Provisional application No. 63/073,791, filed on Sep. 2, 2020.

(51) Int. Cl.
*G06N 20/00* (2019.01)
*G06F 16/951* (2019.01)
(Continued)

(52) U.S. Cl.
CPC .......... *G06F 16/345* (2019.01); *G06F 3/0482* (2013.01); *G06F 16/951* (2019.01);
(Continued)

(58) Field of Classification Search
CPC .... G06F 16/345; G06F 16/951; G06F 40/295; G06F 3/0482; G06N 20/00; G06K 9/6256
See application file for complete search history.

(56) References Cited

U.S. PATENT DOCUMENTS 11,227,153 B2 * 1/2022 Ayyadevara ......... G06K 9/6201
11,354,655 B2 * 6/2022 Benkreira ............ G06Q 20/384
(Continued)

OTHER PUBLICATIONS

"International Search Report and Written Opinion Issued in PCT Application No. PCT/US2021/035062", dated Sep. 8, 2021, 10 Pages.

*Primary Examiner* — Beau D Spratt

(57) ABSTRACT

Aspects of the present disclosure are directed to providing a rich content experience based on information received from unstructured content. A plurality of information items may be obtained from a plurality of data source, where each information item includes unstructured content. The plurality of information items may be provided to a trained machine learning model, where the model is trained with training data that includes information items and corresponding labeled entities for a plurality of historical events. In examples, a formatted request may be received, where the formatted request is associated with one or more labeled entities associated with the trained machine learning model. The trained machine learning model may identify multiple entities from the unstructured content based on the formatted request associated with the one or more labeled entities. In examples, each identified entity of the multiple identified entities is stored as structured content responsive to the formatted request.

18 Claims, 13 Drawing Sheets

(51) Int. Cl.
   *G06F 16/34* (2019.01)
   *G06F 40/295* (2020.01)
   *G06F 3/0482* (2013.01)
   *G06F 18/214* (2023.01)

(52) U.S. Cl.
   CPC .......... *G06F 18/214* (2023.01); *G06F 40/295* (2020.01); *G06N 20/00* (2019.01)

(56) References Cited

U.S. PATENT DOCUMENTS

| | | | |
|---|---|---|---|
| 2014/0283055 A1 | 9/2014 | Zahran | |
| 2015/0248917 A1* | 9/2015 | Chang | G11B 27/031 |
| | | | 386/282 |
| 2017/0235784 A1 | 8/2017 | Seon et al. | |
| 2019/0340306 A1* | 11/2019 | Harrison | G06T 15/506 |
| 2020/0202408 A1* | 6/2020 | Raviv | G06Q 30/0631 |
| 2020/0311350 A1* | 10/2020 | Makino | G06N 3/08 |
| 2021/0004790 A1* | 1/2021 | Di Iorio | G06Q 20/223 |
| 2021/0263978 A1* | 8/2021 | Banipal | G06N 20/00 |
| 2021/0304121 A1* | 9/2021 | Lee | G06F 16/215 |
| 2022/0012296 A1* | 1/2022 | Marey | G06F 16/9538 |
| 2022/0067285 A1* | 3/2022 | Sellam | G06F 40/51 |

\* cited by examiner

GENERATING STRUCTURED DATA FOR RICH EXPERIENCES FROM UNSTRUCTURED DATA STREAMS

CROSS-REFERENCE TO RELATED APPLICATIONS

The present disclosure claims priority to U.S. Provisional Patent Application No. 63/073,791 filed Sep. 2, 2020, the disclosure of which is hereby incorporated by reference in its entirety.

BACKGROUND

Traditionally, in instances where structured data is available for a specified domain, e.g., based on a subscription service for a sport such as wrestling, a search engine can easily provide a rich experience to users because all information about the domain is readily available as structured content, which can be easily indexed and utilized by the search engine to build a user experience. However, to generate the structured content, there is often a significant amount of manual effort required. For example, an individual may need to be present at each event to witness what occurs and provide a write-up, such as an article, for people to read. Further, an individual may need to write the information again in structured form for search engines to access. Accordingly, the duplicated effort may contribute to a significant amount of time and expense involved in order to provide information in both article and structured form. Further, a structured data provider may charge a monthly, yearly, per access, or volume fee associated with the information because the information is vetted, checked, reliable, and is often provided in real-time with little to no time delay. While a single event may not be cost prohibitive, generating the content for all events or subscribing to data for all events in a particular domain, such as wrestling, may be cost prohibitive. Moreover, generating the content for multiple domains or subscribing to structured data for multiple domains, such as wrestling, football, baseball, and basketball, may be extremely cost prohibitive.

It is with respect to these and other general considerations that embodiments have been described. Also, although relatively specific problems have been discussed, it should be understood that the embodiments should not be limited to solving the specific problems identified in the background.

SUMMARY

In accordance with examples of the present disclosure, instead of, or in addition to, obtaining structured information from a structured data provider, information of interest that is available in an unstructured format may be extracted and utilized to generate a user interface to provide a rich content experience to a user. That is, information from an unstructured information item, such as an article, may be processed to identify or otherwise extract information to be used to generate a user interface. In some examples, the information must first be verified and then stored in accordance with a preexisting schema or according to a structured format. The populated schema may then be indexed such that a search engine or service may provide a user interface rich with data from unstructured content data sources to a user. Accordingly, manual creation of structured data may be avoided without substantially impacting the user experience.

Some examples include a method for generating structure content for an event. The method may include obtaining a plurality of information items from a plurality of data sources, where each information item includes unstructured content about the event. The method may further include providing the plurality of information items to a trained machine learning model, where the model is trained with training data that includes information items and corresponding labeled entities for a plurality of historical events. In addition, the method may include receiving a formatted request, where the formatted request is associated with one or more labeled entities associated with the trained machine learning model and identifying, by the trained machine learning model, multiple entities from the unstructured content based on the formatted request associated with the one or more labeled entities. In some examples, the method may include storing each identified entity of the identified multiple entities as structured content responsive to the formatted request when a number of matching identified entities for each identified entity of the identified multiple entities exceeds a threshold and then including the structured content in a search index. By identifying an entity from unstructured content as described above, one is not limited to a structured format of a data provider thereby allowing greater flexibility in the information received. In addition, multiple sources of unstructured content may be utilized thereby allowing a user experience to be provided to a user without being dependent upon a single and/or specific structured data provider which may be prone to issues affecting availability. In some instances, configurations to a system required by a structured data provider may be avoided. For example, a configuration which places structured data behind a paywall and requires one to logon and provide identity credentials or requires explicit adherence to information security protocols may be avoided. In some instances, time and expense associated with obtaining (e.g., generating or receiving) structured data may be avoided without substantially impacting the user experience.

Some examples include a computing system including one or more processors and memory coupled to the one or more processors. The memory may store one or more programs configured to be executed by the one or more processors, where the one or more programs include instructions to obtain a plurality of information items from a plurality of data sources, where each information item includes unstructured content. The instructions may cause the processor to provide the information item to a trained machine learning model, where the model is trained with training data that includes information items and corresponding labeled entities for a plurality of historical entities, and receive a formatted request, where the formatted request is associated with one or more labeled entities associated with trained machine learning model. In some examples, the instructions cause the processor to identify, using the trained machine learning model, multiple entities from the unstructured content based on the formatted request associated with the one or more labeled entities, and store each identified entity of the identified multiple entities as structured content responsive to the formatted request when a number of matching identified entities for each identified entity of the identified multiple entities exceeds a threshold.

By identifying an entity from unstructured content as described above, one is not limited to a structured format of a data provider thereby allowing greater flexibility in the information received. In addition, multiple sources of unstructured content may be utilized thereby allowing a user experience to be provided to a user without being dependent upon a single and/or specific structured data provider which may be prone to issues affecting availability. In some instances, configurations to a system required by a structured data provider may be avoided. For example, a configuration which places structured data behind a paywall and requires one to logon and provide identity credentials or requires explicit adherence to information security protocols may be avoided. In some instances, fees associated with structured data providers may be avoided without substantially impacting the user experience.

Some examples include a method for training a machine learning model. The method may include receiving a request from a requesting entity to train a machine learning model to extract relevant information from unstructured content; identifying a plurality of keywords from a plurality of information items including unstructured content; associating a formatted request for one or more entities with the plurality of keywords; training the machine learning model with the plurality of keywords and the formatted request; and providing the trained model to the requesting entity. By providing a request to train a machine learning model to extract relevant information from unstructured content, a system hardware configuration that is more efficient at training such a machine learning model may be utilized thereby saving time and computing resources. Accordingly, once trained, the trained model may be utilized by one or more entities utilizing non-specific hardware for example. In addition, by training the machine learning model to extract relevant information from unstructured content, unstructured content may be utilized thereby allowing a user experience to be provided to a user without being dependent upon a single and/or specific structured data provider which may be prone to issues affecting availability. In some instances, by training and then using the trained machine learning model, configurations to a system required by a structured data provider may be avoided. For example, a configuration which places structured data behind a paywall and requires one to logon and provide identity credentials or requires explicit adherence to information security protocols may be avoided. In some instances, fees associated with structured data providers may be avoided without substantially impacting the user experience.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, structured data from an article about an event may be utilized to generate a user interface providing a rich content experience to a user. As an example, an article may reference an unscripted music event where different artists played different songs. The article may identify the artists, the songs played by the artists, and the order of the songs for example. The article may be accessed by a content scraper and processed using a machine learning model to identify or otherwise extract information for generating a user interface. In some examples, the information must first be verified and then stored in accordance with a preexisting schema or according to a structured format. The populated schema may then be indexed such that a search engine or service may provide a user interface rich with data from the article to a user. Thus, instead of, or in addition to, obtaining structured information from a structured data provider, where the structured information includes information about the unscripted music event, information of interest that is available in an unstructured format (e.g., the article) may be extracted and utilized to generate the user interface. Accordingly, manual creation of structured data may be avoided without substantially impacting the user experience.

Figure 1:
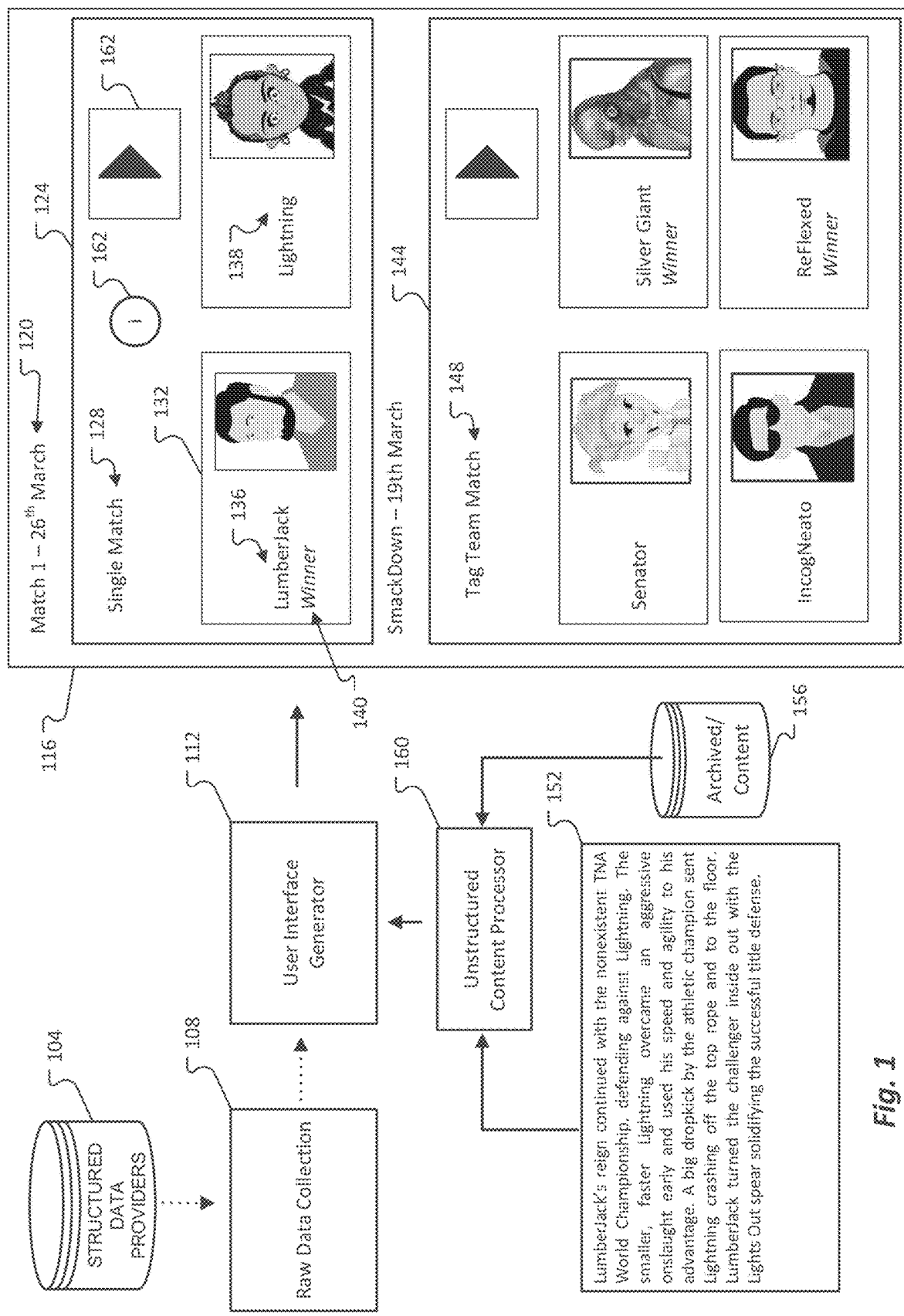
FIG. 1 depicts an example of a system for presenting content to one or more users in accordance with examples of the present disclosure.

FIG. 1 depicts an example of a system 100 for presenting content to one or more users in accordance with examples of the present disclosure. The system 100 generally includes a structured, or semi-structured, data provider 104 which may provide information from or about an event scheduled to occur (or that has occurred) at a time and/or on a date. An event may correspond to an episode, incident or occasion that occurs. For example, in the domain of sports, an event may correspond to a match or meeting between two teams, individuals, or groups. Structured and semi-structured information refers to information that conforms to some extent to an organizational scheme. A table is an example of structured information. A markup language document or an email message may correspond to an example of semi-structured information. Unstructured information refers to information that does not conform to any a priori organizational scheme. For example, a free-form text news article represents an instance of unstructured information. The body, or content, of an email message may also correspond to unstructured information. As another example, a transcript or summary of an event, an audio stream or audio segment of an event or summary of an event, and/or a video stream or video segment of an event or summary of an event may also be considered to be unstructured information.

In some examples, the structured data providers 104 may correspond to a paid service, such as a service or company responsible for obtaining information about or from an event. For example, in the sports domain, a structured data provider 104 may collect and/or generate statistical information about a particular match or meeting between two or more teams. As one non-limiting example, the structured data provider 104 may correspond to a service that collects statistical information on each wrestler and/or each match of a wrestling event; that is statistical information, such as how many wins, how many losses, a number of times one wrestler has encountered another wrestler, the wrester's win rate on Mondays vs. Tuesday, and the like. The structured data may be collected and assembled into a raw data collection 108 and provided to a user interface generator 112, where the user interface generator 112 may generate a user interface 116 displaying structured information that was collected and stored in the raw data collection 108. As one non-limiting example, the user interface 116 may include a content card 124 or other entity that allows a developer to present information, or attributes, to a user accessing such information through a web interface or application (app). As an example, the user interface 116 may include a date 120 indicating when an event, such as a wrestling match occurred, a type of match 128, the participants 136 and 138 in the match, and a winner (or match outcome) 140. As another example, the user interface 116 may provide additional information about past matches, such as the match contained in the content card 144 indicating a type of match 148 (e.g., a tag team match) occurred; alternatively, or in addition, the user interface 116 may provide additional information about upcoming matches.

In some examples, by selecting a participant 136 or 138, additional information specific to the participant may be displayed to a user interacting with the user interface 116. That is, the raw data collection 108 may include additional information about each participant, match, event, and/or date—such information may be accessible by a user when a user selects a corresponding attribute on the user interface 116, where the corresponding attribute may correspond to user interface elements displayed at the user interface 116, such as but not limited to the date 120, the match type 128, content card 132, the participants 136 and 138, and/or the outcome 140. In some examples, a user may select an attribute control 162 to access the additional information about each participant, match, event, and/or date. In some examples, a control 164 may allow a user to access media, such as audio or video media, describing the information available via the content card 124. For example, the control 164 may be a link to a video file or video streaming service for the particular event.

In some examples, the raw data collection 108 may be indexed by a search engine, such as Bing™, such that if a user were to search specifically for content related to a domain, such as wrestling, the user interface generator 122 may generate user interface 116 including relevant information requested by the user. That is, a rich experience may be provided, or otherwise available, for a user. In instances where structured data is available for a specified domain, such as sports generally or wrestling as a specific example, providing such a rich experience to a user is relatively easy for the search engine because all information about the domain is readily available from the structured data provider 104. However, there is often a significant cost factor involved when manually generating structured data or receiving the structured data from third-party providers. For example, there may be a significant amount of time and expense involved in having individuals present at each event to witness what occurs and generate the structured data. As another example, a third-party structured data provider 104 may charge a monthly, yearly, per access, or volume fee associated with the information provided for indexing by a search engine because the information is vetted, checked, reliable, and is often provided in real-time with little to no time delay. As another example, when a football team scores a touchdown, the structured data providers 104 covering the football game may make the scoring update immediately available to the raw data collection 108, which in turn would make such information readily available to a user interface generator 112 and/or search engine providing the user interface 116. While a single event may not be cost prohibitive, having access to data for all events in a particular domain, such as wrestling, may be cost prohibited. Moreover, having access to structured data for multiple domains, such as sports (e.g., wrestling, football, baseball, and basketball), e-sports, arts (e.g., concerts and performances), and games of chance may be even more cost prohibitive.

In accordance with examples of the present disclosure, instead of, or in addition to, receiving structured information from a structured data provider 104, information of interest that is available in an unstructured format may be extracted, formatted, and utilized to generate a user interface, such as the user interface 116. That is, an unstructured information item 152, such as an article or social media post, may be processed by an unstructured content processor 160 to identify or otherwise extract information to be used by the user interface generator 112. In some examples, the information extracted or otherwise identified from the unstructured information item 152 may be compared to historical or otherwise archived content that is readily available in a archived content data source 156. For example, in many domains, such as wrestling as a non-limiting example, historical or archived content may be readily available, such as information about participants in previous matches, information about who won a prior match or event, and information about how such match or event was won (e.g., knock-out or decision). In some examples, historical and/or archived information content 156 may be limited such that the information available may be limited to a list of previous participants. Accordingly, a participant identified or extracted from the unstructured information item 152 may be compared to the participant found in the archived content data source 156. Upon matching information in the archived content data source 156, the extracted or identified information may be provided to the user interface generator 112 and used to generate the user interface 116. In some examples, extracted or identified information may be provided as structure content (e.g., serve as a replacement to data provided by a structured data provider).

Figure 2:
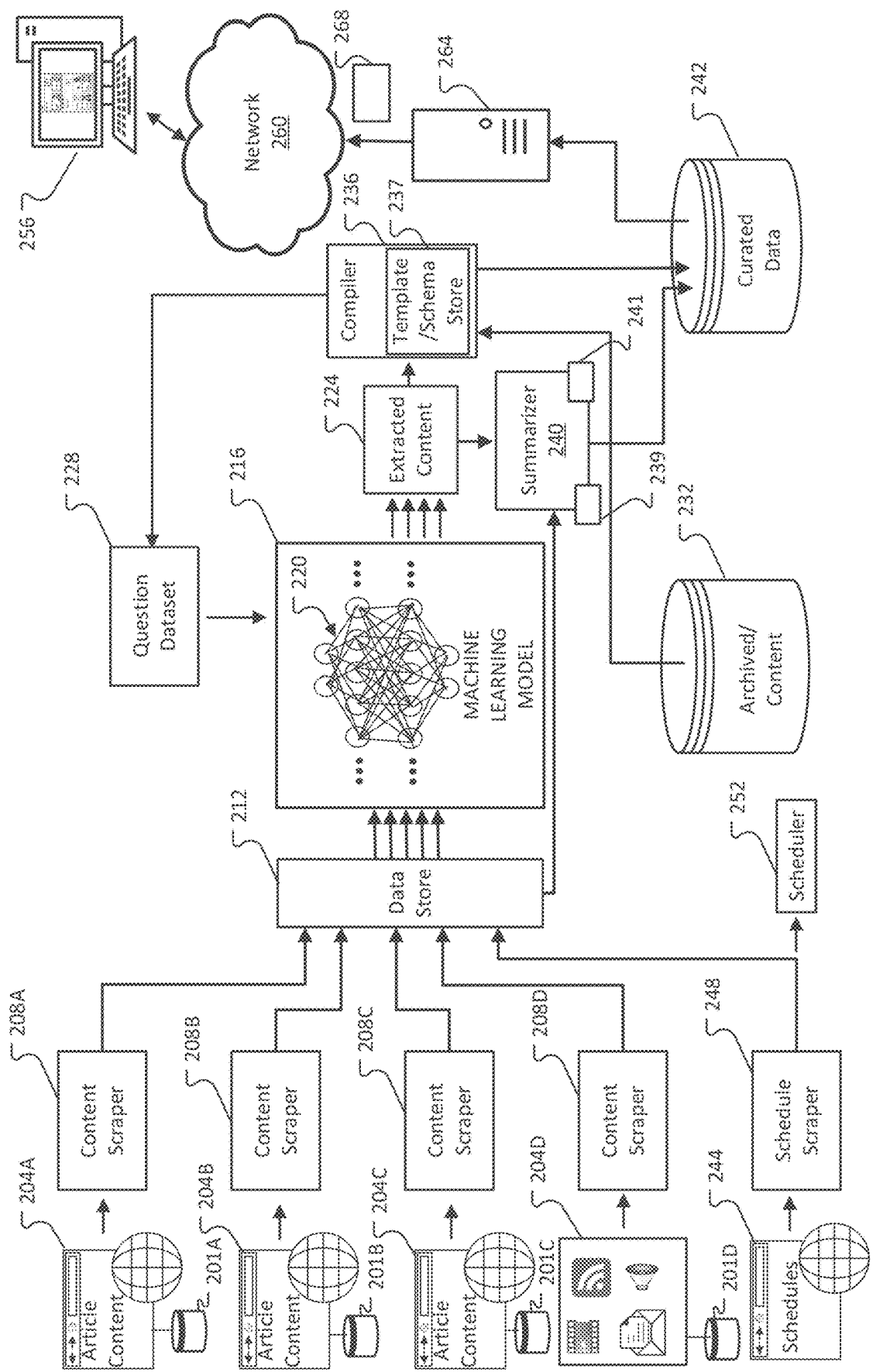
FIG. 2 depicts details of an unstructured data extraction system in accordance with examples of the present disclosure.

FIG. 2 depicts details of an unstructured data extraction system 200 in accordance with examples of the present disclosure. The unstructured data extraction system 200 may include one or more content scrapers 208A-208D, where each of the content scrapers 208A-208D may be configured to extract or otherwise obtain unstructured data from one or more information items 204A-204D. As on example, one or more of the information items 204A-204D may be any type of unstructured content, such as but not limited to a text article posted on a website, a body of an email, audio content, video content, unstructured really simple syndication (RSS) feeds, etc. Each of the information items 204A-204D may be different from one another. For example, each of the information items 204A-204D may originate from a different website or source 201A-201D. As an example, the information item 204A may be an article from a publicly available news site 201A; the information item 204B may be an article from a private website 201B that is available for a minimal subscription fee; the information item 204C may be another publicly available website; 201C and the information item 204D may correspond to a transcript of an event, such as a wrestling match. In some examples, the information items 204A-204D may be different information items 204A-204D, but may originate from one or more common sources. For example, the information item 204A may be a first article from a first news site and the information item 204B may be a second article from the same news site. As another example, the information item 204A may be an article published by a news organization and the information item 204B may be a social media post from the same news organization. In some examples, factual data from one or more of the information items 204A-204D is collected from an associated content scraper 208A-208D. In some examples, multiple information items 204A-204D are collected for purposes of data validation. That is, if content appears in three or more different articles, then the content may be qualified as a fact. Examples of factual data in sports and e-sports domains may include, but is not limited to, scores, participant names, match titles, teammates, player names, audience size, venue, and the like. Examples of factual data in the arts domain may include, but is not limited to, participant artists, singers, band members, headliners, supporting acts, songs, audience size, venue, and the like. Examples of factual data in the games of chance domain may include, but is not limited to, participants, rounds or stages, odds, audience size, venue, and the like.

Each of the content scrapers 208A-208D may provide the collected content to a data store 212. For example, the data store 212 may represent a database or another storage mechanism for storing one or more information items 204A-204D. Once stored, each of the stored information items 204A-204D may be provided to a machine learning model 216. The machine learning model 216 may be trained on information items similar to the information items 204A-204D together with corresponding labels for particular entities, where entities relate to keywords relevant to a particular domain such as participant names, event names (e.g., match, game, etc.), and scoring terms (e.g., knock-out, numerical score, etc.), for example. In examples, the machine learning model 216 may include a neural network 220. For example, the neural network 220 may be, or include, a natural language processing (NLP) neural network. In some examples, the machine learning model 216 may be a previously trained Bidirectional Encoder Representations from Transformers (BERT) NLP model. Alternatively, or in addition, the machine learning model 216 may include, but is not limited to a Generative Pre-trained Transformer 3 (GPT-3) model, a text-to-text transformer (T5) model, or an XLNet model. The machine learning model 216 may receive the information from the data store 212 and identify, determine, and/or extract pieces of information according to a question dataset 228. The question dataset 228 may include one or more questions which are utilized by the machine learning model 216 to identify, determine, or extract factual information that is determined to be relevant. As an example, the question may be similar to "who won?" or "who are the participants?" The questions in the question dataset 228 are formatted in a manner such that the machine learning model 216 is capable of ingesting the question and using the question as a basis for determining relevant information as will be further described.

Utilizing the question dataset 228, the machine learning model 216 may identify relevant information, such as which participant won the event, how the event was won, etc. The machine learning model 216 may extract such information as extracted content 224, where a compiler may populate an existing schema with the extracted content 224 or otherwise store the extracted content 224 in accordance with a predefined schema in the schema store 237. The schema store 237 may correspond to a structured or semi-structured file that includes the extracted content 224 and structural information indicating how the extracted content 224 is related to one another and/or how the extracted content 224 should be displayed. As one non-limiting example, the schema store 237 may correspond to an html and/or xml file. In addition, the extracted content 224 may be compared to historical, archived content 232 as part of a validation process. That is, information identifying participants extracted from or identified from the one or more information items 204A-204D may be compared to a database of existing participants. For example, if the extracted content were to include "Lightning" as a participant, the archived content repository 232 may be searched to determine whether "Lightning" is included as a participant in the archived content repository 232. Such a search may be limited to a single domain, for example wrestling; alternatively, the search may be across a plurality of domains, for example, wrestling, boxing, and football. In this way, if "Lightning" is an important figure in one domain (e.g., e-sports or MMA) and participates in an event in a separate domain (e.g., wrestling), the system would be able to establish the link and indicate this to users.

The archived content repository 232 may be the same as or similar to the archived content repository 156. In some cases, information extracted from or otherwise identified from the information items 204A-204D may not be in the archived content repository 232. That is, information identifying outcomes of matches or events, and/or information that is generally only recently available may not be included in the archived content repository 232. For example, extracted content 224 may include a winner of a match/event, or a how an event was won; however, the archived content repository 232 would not include such information. Even so, the extracted content 224 that may be matched to content in the archived content repository 232 (e.g., based on participant names, team name, scheduled event information, etc.) and may then be used to populate a template and/or schema 237 by the compiler 236. In some examples, the compiler 236 may also generate a user interface, or otherwise populate an existing user interface in accordance with the predefined schema; the extracted content populated into a template and/or schema may then be stored to the curated data repository 242.

In some examples, information from the archived content repository 232 may be utilized to conflate or otherwise add additional information to the extracted content 224 from the archived content repository 232. For example, a birthdate associated with a participant may exist within the archived content repository 232 and may be associated with a participant. Accordingly, when a participant is identified in extracted content 224, the participant's birthdate or age may be added to the template/schema store 237 by the compiler 236. As another example, information about a participant's life outside the particular domain may be added to the template schema store 237, thereby enriching the user experience.

In some examples, a summary of the information items 204A-204D obtained via the content scrapers 208A-208D may be generated by the summarizer 240. For example, the summarizer 240 may generate a summary 241 based on a description, such as text sentences and/or segments, and store the description in the curated data repository 242. Thus, the summarizer 240 may utilize a machine learning model to understand the context and semantics of each of the information items 204A-204D and to create, or generate, a new event summary 241. As another example, the summarizer 240 may be extractive in nature, where existing text segments, such as phrases or sentences from the information items 204A-204D may be used to create a summary 241. For example, the summarizer 240 may segment the text from each of the information items 204A-204D into phrases, and/or sentences, for example, then combine the segments 239 and weight each segment based on a similarity. Those segments having a highest weight may then be assembled into a summary and stored in the curated data repository 242. For example, a neural network model that performs natural language generation tasks may receive the segments 239 and generate the summary. In examples, the neural network model may be a T5 model, a BERT model, an XLNet model, and/or a different model performing a text-to-text transformation. In some examples, the summarizer 240 may also utilize the extracted content 224 to determine focused content, or content that should otherwise be highlighted, or at least included, in the curated data repository 242.

Information in the curated data repository 242 may be indexed utilizing one or more search engines, such as Bing™. In some examples, a search engine provider may index the content in the curated data repository 240 and search such content via a server 264, where the server 264 may generate a user interface 268 based on the stored data in the curated data repository 240 and provide the user interface 268 to a processing device 256 via the network 260.

In examples, the content scrapers 208A-208D may be associated with a specific information item 204A-204D and/or source. In other examples, a single content scraper 208A for example, may scrape content from each information item 204A-204D; that is, the content scraper 208A may be configured differently based on a source of information items and/or information item types, such as but not limited articles, social media posts, email bodies, audio, video, etc. In some examples, a schedule scraper 248 may identify a schedule of events from one or more schedules 244 and configure one or more of the content scrapers 208A-208D to scrape content from the information items 204A-204D according to scheduled events in one or more domains. In some examples, a scheduled event may correspond to an airing of an event, such as a live broadcast or the like.

Figure 3:
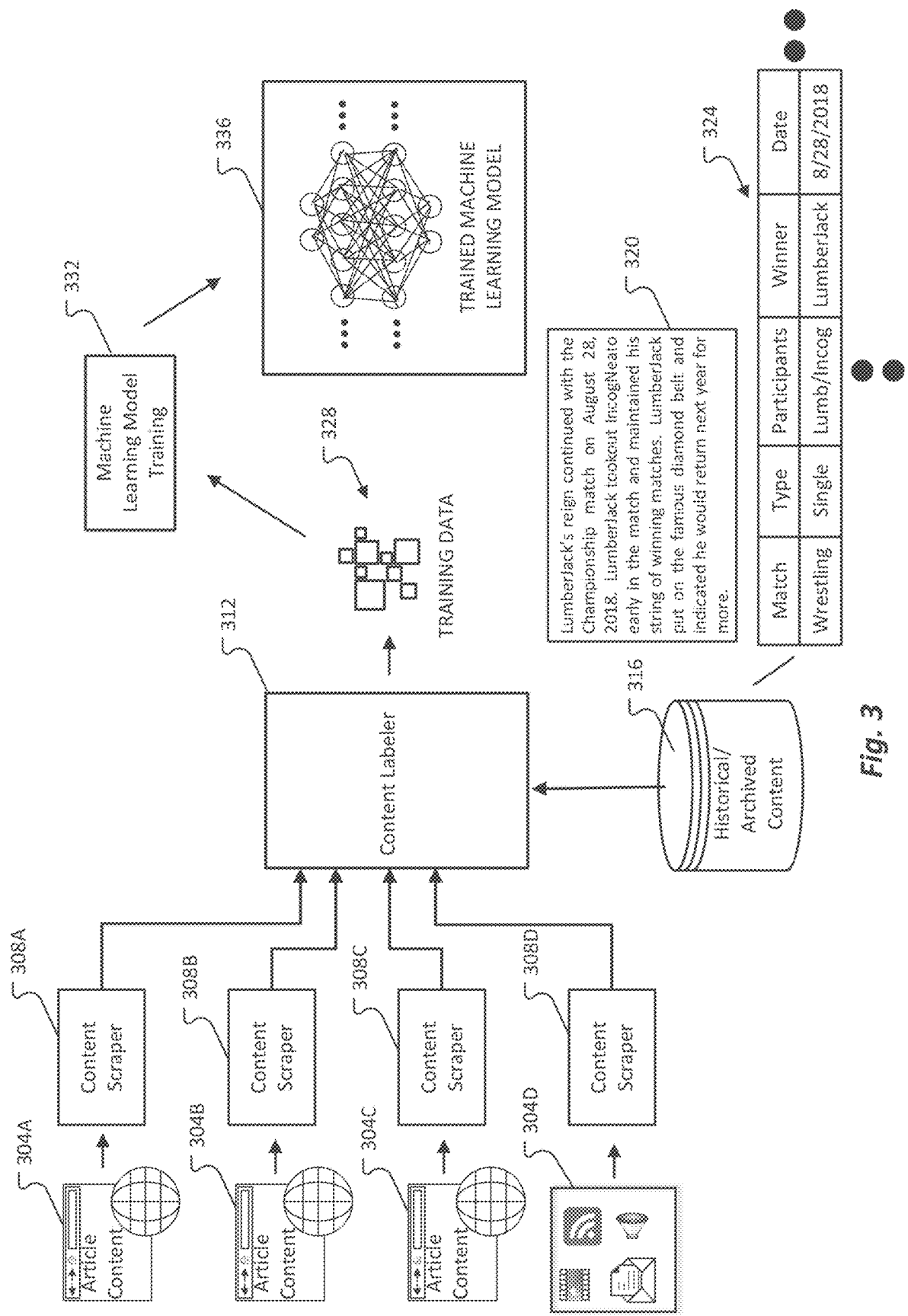
FIG. 3 depicts details directed to training a machine learning model in accordance with examples of the present disclosure.

FIG. 3 depicts details directed to training a machine learning model in accordance with examples of the present disclosure. One or more content scrapers 308A-308D may be utilized to identify information items 304A-304D for purposes of labeling and training the machine learning model 336. For example, each of the content scrapers 308A-308D may be configured to extract or otherwise obtain unstructured data from one or more information items 304A-304D. The unstructured data may be obtained from a semi-structured source, such as an email or markup language document. As on example, one or more of the information items 304A-304D may be any type of unstructured content, such as but not limited to a text article posted on a website, a body of an email, audio content, video content, unstructured really simple syndication (RSS) feeds, social media posts, etc. Each of the information items 304A-304D may be different from one another. For example, each of the information items 304A-304D may originate from a different website or source. As an example, the information item 304A may be an article from a publicly available news site; the information item 304B may be an article from a private website that is available to a select group (e.g., for a minimal subscription fee); the information item 304C may be another publicly available website; and the information item 304D may correspond to a transcript of an event, such as a wrestling match. In some examples, the information items 304A-304D may be different information items 304A-304D, but may originate from one or more common sources. For example, the information item 304A may be a first article from a first news site and the information item 304B may be a second article from the same news site Each of the information items 304A-304D may be associated with the same event that has occurred in the past such that relevant information associated with each of the information items 304A-304D may be identified utilizing the content labeler 312. For example, keywords that are specific to a domain, sport, or area, such as wrestling for example, may be identified from the information items 304A-304D. That is, in the wrestling domain, keywords specific to wrestling may be identified from the information items 304A-304D. In some examples, additional keywords (e.g., participant names, team names, scoring terms, etc.) may be provided from a archived content repository 316, where such additional keywords may be previously identified keywords from other information items 304A-304D and/or other domains or areas. Accordingly, the keywords for example, may be associated with information 324 which may be in the form structured content previously identified from the article 320. In aspects, information 324 may be built into a structured format by the data compiler 236 that combines archived content 316 with extracted content (e.g., extracted content 224) from subsequent information items (e.g., information items 204A-204D).

The keywords that are identified from the content labeler 312 may be provided as training data 328 to train a machine learning model 332. In some examples, rather than training a machine learning model from scratch, transfer learning may be applied to an existing trained machine learning model. The pre-trained machine learning model may correspond to the BERT neural network model as one example, however other neural network models are contemplated. By using transfer learning, an amount of time, effort, resources, etc., can be substantially reduced during a training process. Once the machine learning model 332 has been trained, the trained machine learning model 336 may be utilized to identify relevant information, such as one or more entities, from a plurality of subsequent information items.

In some examples, unstructured content from one or more of the information items 304A-304D may be obtained by a content scraper 308A and provided to the content labeler 312. The content labeler 312 may utilize the archived content repository 316 to label each instance of the information items 304A-304D. For example, an article, such as the article 320 obtained by a content scraper 308A, for example, may be provided to the content labeler 312. The article 320 may then be labeled according to the information 324 being identified as relevant. As another example, a record of the match described by the article 320 may be stored in the archived content repository 316 and added to the structured content of information 324. Accordingly, the article 320 may be labeled with a match:wrestling; a type: single; participants:LumberJack/Incognito; winner:LumberJack, and date of the match being set to Aug. 28, 2018.

Once the information items 304A-304D are labeled, for example, the labeled information item may be stored as training data 328. The machine learning model 332 may then be trained using the training data 328. The training of the machine learning model 332 may include training a machine learning model from scratch and/or making use of transfer learning to update or otherwise train a pre-trained machine learning model. As one example, the pre-trained machine learning model may correspond to the BERT neural network model. By using transfer learning, an amount of time, effort, resources, etc., can be substantially reduced during a training process. Once the machine learning model has been trained, the trained machine learning model 336 may be utilized to identify relevant information, such as one or more entities, from a plurality of subsequent information items.

In some examples, a requesting entity, such as the processing device 256 of FIG. 2, may request a trained machine learning model (e.g., trained machine learning model 336). In aspects, the processing device 256 may submit a request requesting information regarding a domain (e.g., wrestling) to a trained machine learning model for that domain. In further aspects, the request for information may be selected from a set of pre-formatted questions directed to the trained machine learning model. Thus, the machine learning model 332 may be trained by identifying a plurality of entities from a plurality of information items (e.g., information items 304A-304D) including unstructured content. The trained learning model 336 may then respond to formatted requests for information from subsequent information items. That is, the formatted request (or question) may be pre-formatted to associate keywords in the request (e.g., "who" and "won") with one or more entities (e.g., "participant name," "knockout," "decision on points," etc.) identified for a particular domain (e.g., wrestling). The trained machine learning model 336 may then process the formatted request and return results to the processing device 256.

Figure 4:
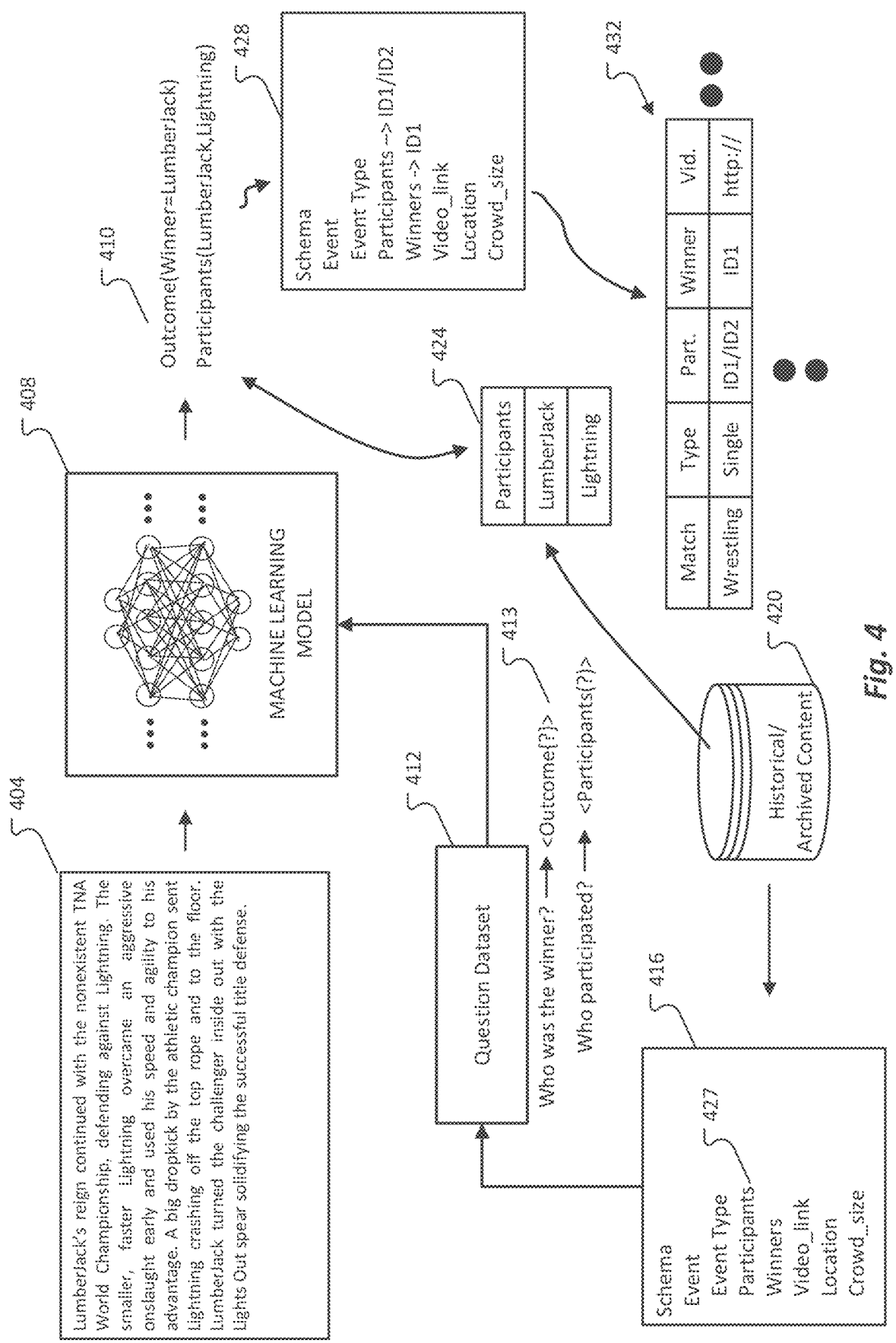
FIG. 4 depicts additional details directed to extracting relevant information from one or more information articles in accordance with examples of the present disclosure.

FIG. 4 depicts additional details directed to extracting relevant information from one or more information items 404 in accordance with examples of the present disclosure. An information item 404 may include unstructured content and may be provided to the machine learning model 408, where the machine learning model 408 may be the same as or similar to the previously described machine learning model 216. The information item 404 may be the same as or similar to at least one of the previously described information items 204A-204D. In examples, a question dataset 412 may also be provided to the machine learning model 408, where the question dataset 412 may be the same as or similar to the question dataset 228 previously described and may include a plurality of questions provided to the machine learning model 408 such that the machine learning model 408 can extract relevant information, or entities, from the information item 404 based on the question dataset 412. In examples, a question may be presented in the form of a formatted request 413 for an entity. For example, the question "who was the winner?" may be formatted as <Outcome?>. The questions and/or the formatted requests for an entity within the question dataset 412 may be specific to a domain, area, or sport, for example, and may be presented as a list of questions. In some examples, the questions and/or the formatted requests for an entity within the question dataset 412 may be specific to a domain, area, or sport for example, and may be based on a schema 416 derived from or otherwise based on archived content 420. For example, the archived content 420 may include information based on one or more information items; the information from may be formatted (or structured) according to a particular schema, such that the schema 416, that defines the specific entities, or relevant information, that the machine learning model 408 should be identifying for a particular domain based on the input information item 404. For example, the schema 416 may include a label 417 or attribute for the participants; accordingly, one or more questions in the question dataset 412 may be based on the participants attribute or label 417 in the schema 416.

Once the machine learning model 408 has extracted, identified, or otherwise determined one or more pieces of relevant information (as extracted content 224, for example), the extracted content may be compared to information obtained from archived content 420. For example, extracted information 410 may be compared to information in the archived content 420; if the extracted information 410 matches the information 424 (e.g., based on participants, scheduled event time or date, etc.), then the extracted information 410 has completed a first type of validation check. In some examples, the plurality of information items 404 may be input into the machine learning model 408 and the machine learning model 408 may then identify a plurality of entities across the plurality of information items 404 as relevant information. If the number of matching entities extracted from the plurality of information items 404 exceeds a threshold, for example, then the extracted information 410 has completed another type of validation check. In this case, multiple sources of information (e.g., different articles) include the same information, thereby validating the extracted information 410. Accordingly, the extracted information 410 may be populated into an existing schema 428 and/or stored as structured information 432. In examples, the structured information 432 may correspond to a record in a database, an html document, or other document that provides structure to the extracted information 410. In some examples, the extracted information 410 may be processed in some manner prior to being stored in or otherwise associated with the schema 428. As another example, rather than names, a value corresponding to an extracted entity may be hashed, or replaced, with another identifier, such as ID1 or ID2 for example. The schema, together with the populated values may then be stored in a record, database, or as another type of structured content and may be added as archived content 420.

Figure 5:
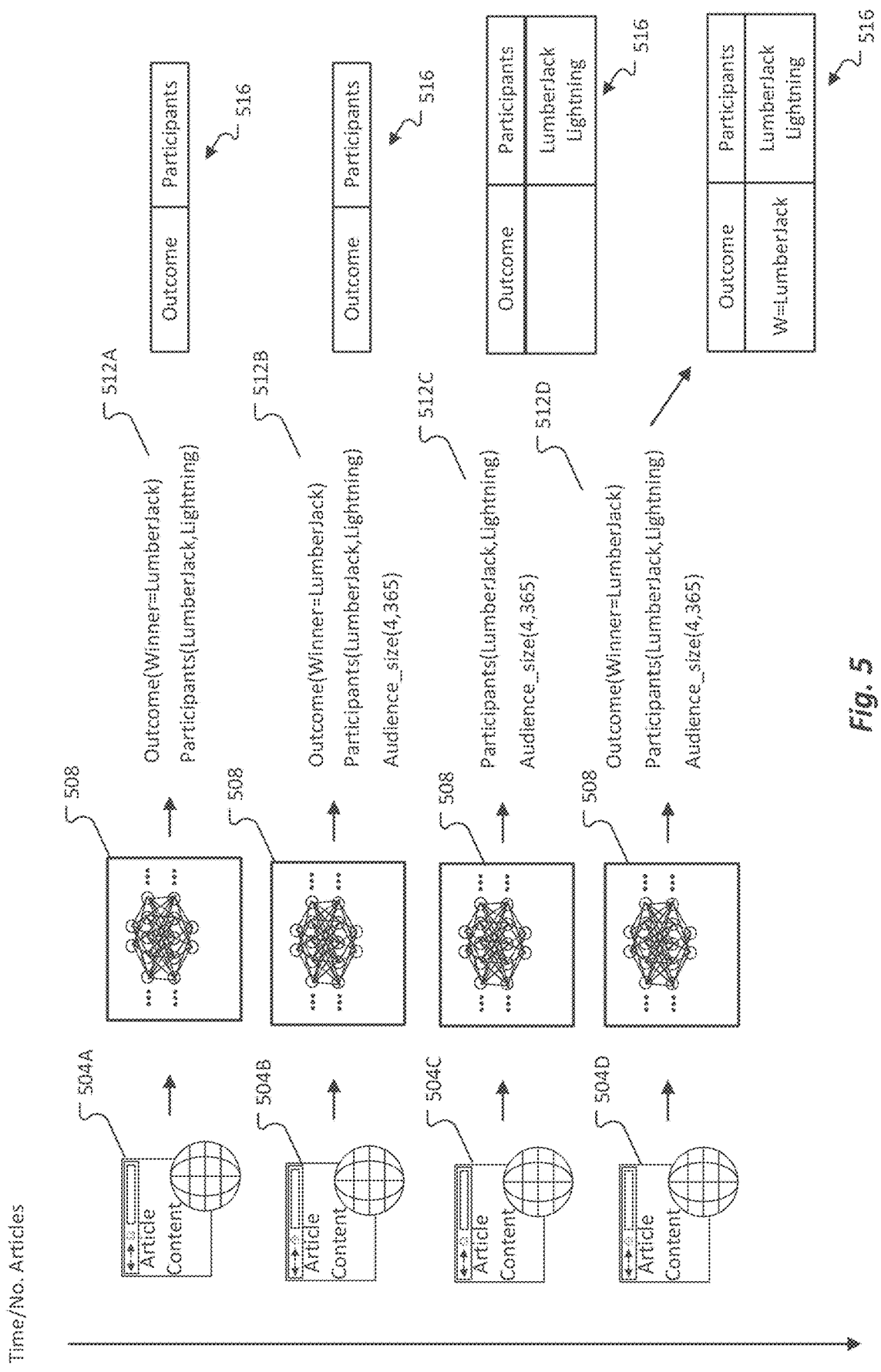
FIG. 5 depicts additional details directed to a data validation process over time in accordance with examples of the present disclosure.

FIG. 5 depicts additional details directed to a data validation process over time in accordance with examples of the present disclosure. More specifically, information items 504A-504D may be accessed by a web content scraper and provided to the machine learning model 508. In some examples, the machine learning model 508 is the same machine learning model for each domain, area, or sport; in other examples, the machine learning model 508 may be specifically trained for a particular domain. A first information item 504A may be provided to the machine learning model 508 and the machine learning model 508 may provide extracted content 512A. In this case, as information item 504A represents a single source of information, the extracted content 512A may not be associated with a particular schema, for example. A second information item 504B may be provided to the machine learning model 508 and the machine learning model 508 may provide extracted content 512B. As information items 504A and 504B only represent two sources of information, the extracted content 512A and 512B, although including matching entities, may not be associated with a particular schema 516, for example. As another example, a third information item 504C may be provided to the machine learning model 508 and the machine learning model 508 may provide extracted content 512C. In this case, information items 504A, 504B, and 504C represent three sources of information and include matching entities (e.g., participants); accordingly, the extracted content 512A, 512B, and 512C associated with the "participants" entity, may be associated with a particular schema 516, for example. As another example, a fourth information item 504D may be provided to the machine learning model 508 and the machine learning model 508 may provide extracted content 512D. The information items 504A, 504B, and 504D having matching extracted content associated with the "winner" entity (e.g., LumberJack) and the participants entity (e.g., LumberJack and Lightning); accordingly, the extracted content 512D associated with the winner and participants may be associated with or otherwise added to the schema 516, for example. However, because only information items 504B and 504C provided relevant information associated with the audience size, for example, the audience size may not be added to the schema 516. Accordingly, in some examples, only relevant information occurring across information items 504 more than a number of times, such as a threshold number of times (e.g., three times), may be added to the schema 516. Thus, including relevant information occurring more than a threshold number of times may reduce the number of typos propagating into the schema 516; as an example, the occurrences of wrong numbers, typos, spelling errors, improper capitalization, and incorrect grammar may be reduced.

Figure 6:
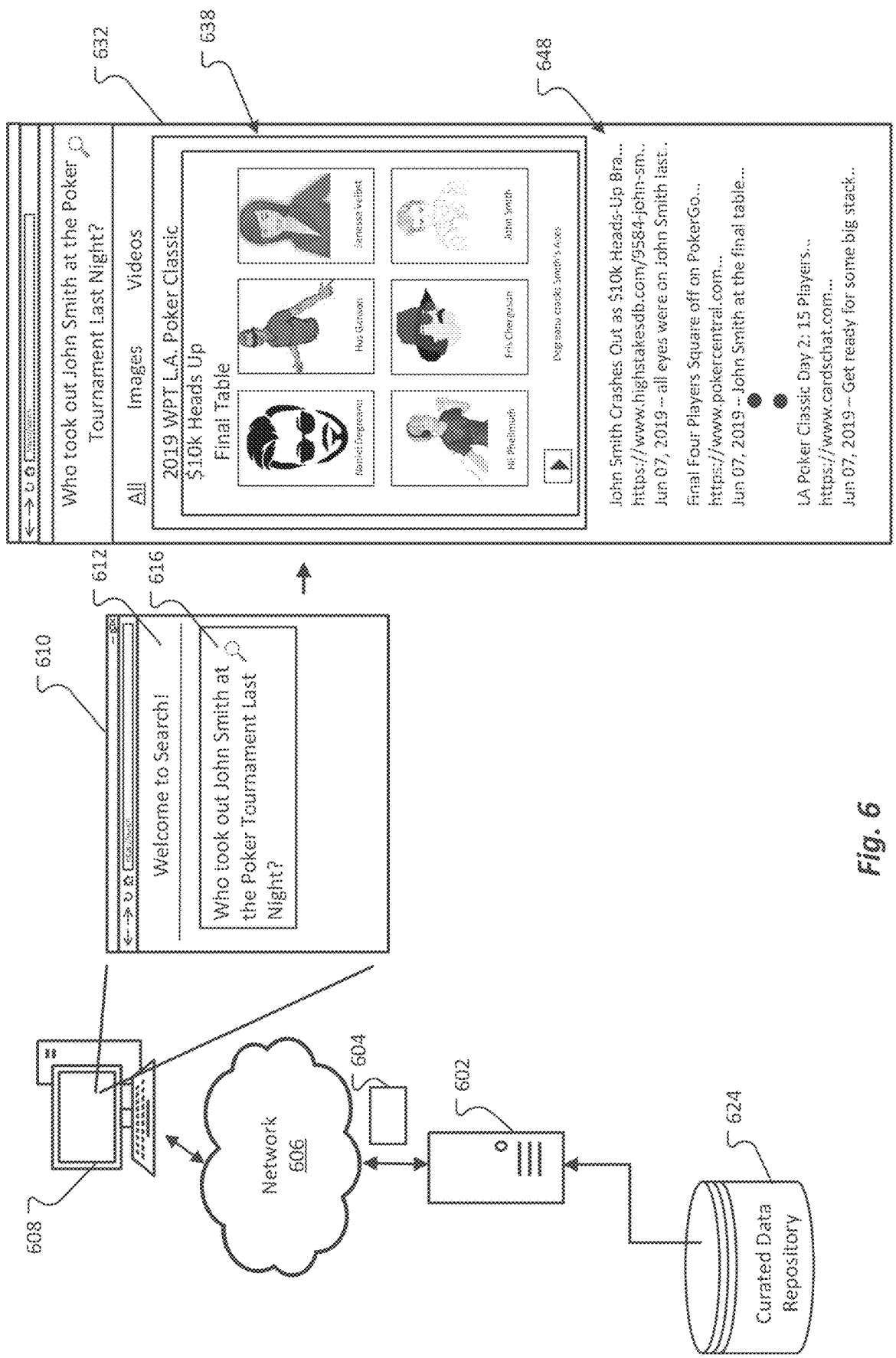
FIG. 6 depicts an example of a system for presenting content to one or more users in accordance with examples of the present disclosure.

FIG. 6 depicts an example of a system for presenting content to one or more users in accordance with examples of the present disclosure. As depicted in FIG. 6, a user may navigate to a web address of a search engine 612 using a web browser 610, or other app, at a computing device 608. The server system 602, which may include one or more computing devices, may cause a user interface 604 to be provided to the computing device 608 such that the web browser 610, or other app, displays the user interface 604. In some examples, the user interface 604 may be provided as mark-up language and include data and/or other information from a curated data repository 624. The user may search specifically for content related to a domain, such as but not limited to sports (e.g., wrestling, football, baseball, and basketball), e-sports, arts (e.g., concerts and performances), and games of chance and the search engine 612 may provide relevant information to the user. More specifically, in addition to search results, the results of the search engine 612 may display media rich content to the user based on the search terms entered by the user.

For example, a user may enter search terms 616 associated with the game of poker; the search terms 616 may be provided to the server system 602. The server system 602 may access the curated data repository 624 and identify curated content associated with the search terms 616. The content identified and retrieved from the curated data repository 624 may then be assembled into a user interface, such as the user interface 632. That is, the user interface generator 604 may assemble a user interface such as the user interface 632, and provide the user interface to the computing device 608 to be rendered or otherwise displayed in the web browser 610 or other app. The user interface 632 may include rich media content 638 associated with the search terms 616 in addition to the search results 648. In examples, the user interface generator 604 may assemble the user interface using a mark-up language, one or more images, and/or include additional factual information identified from the curated data repository 624. As an example, content associated with a poker game is displayed in the user interface 632. The user interface 632 may include content cards associated with each player, a match type, and additional information describing the event.

Figure 7:
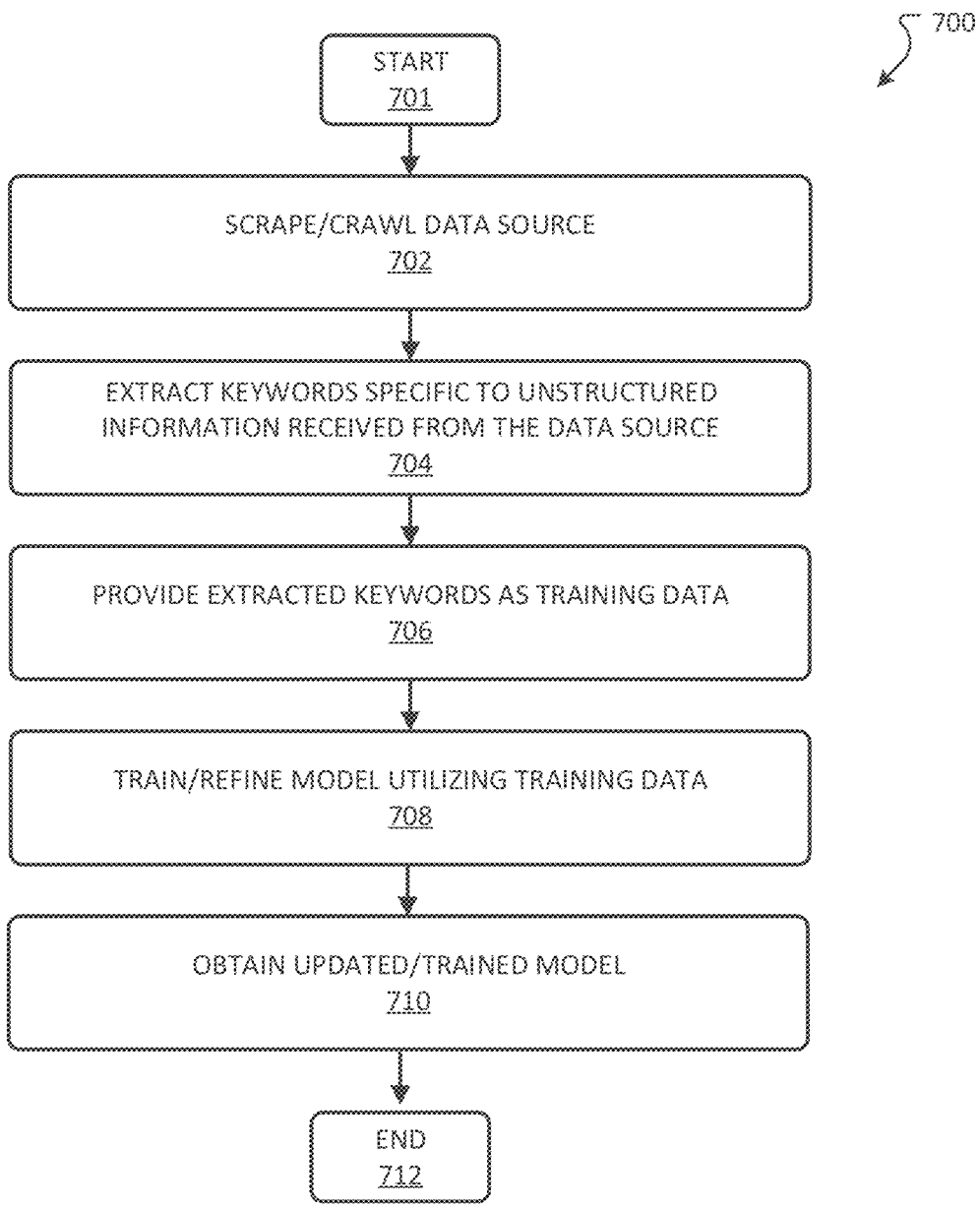
FIG. 7 illustrates an overview of an example method for obtaining training data and training a machine learning model in accordance with examples of the present disclosure.

FIG. 7 illustrates an overview of an example method 700 for obtaining training data and training a machine learning model in accordance with examples of the present disclosure. In examples, aspects of the method 700 are performed by one or more processing devices, such as a computer or server. The method 700 begins at operation 701 and proceeds to 702, where information items, such as information items 304A-304D, associated with a plurality of data sources may be scraped, or crawled, by a content scraper. The content scraper may be the same as or similar to a content scrapers 308A-308D. The content scraper may obtain unstructured content from the information items and provide the unstructured content to a classifier. The classifier may extract keywords specific to unstructured information received from the data source at 704. In examples, the unstructured information may be specific to a domain, area, or sport for example. As one example, the sport may be wrestling. As another example, the domain might be financial information. Accordingly, the keywords may be extracted based on the domain or area. The extracted keywords may then be provided as training data at 706 to a machine learning model. In examples, the machine learning model may be the same as or similar to the machine learning model 332.

Accordingly, at 708, the machine learning model may be trained and/or refined. For example, the machine learning model may be trained from scratch using the keywords extracted from the information items. In some examples, a machine learning model previously trained may be updated, or otherwise refined, to identify the extracted keywords and keyword similarities based on the previously extracted keywords. Accordingly, for a specific model or domain (e.g., wrestling), the machine learning model may determine domain-specific entity information, such as terminology (e.g., "knock-out"), based on the extracted keywords or similar keywords. Thus, the model may be trained or refined using the extracted keywords and the trained model may be stored at 710 and subsequently used to extract content from information items. Method 700 may end at 712.

Figure 8:
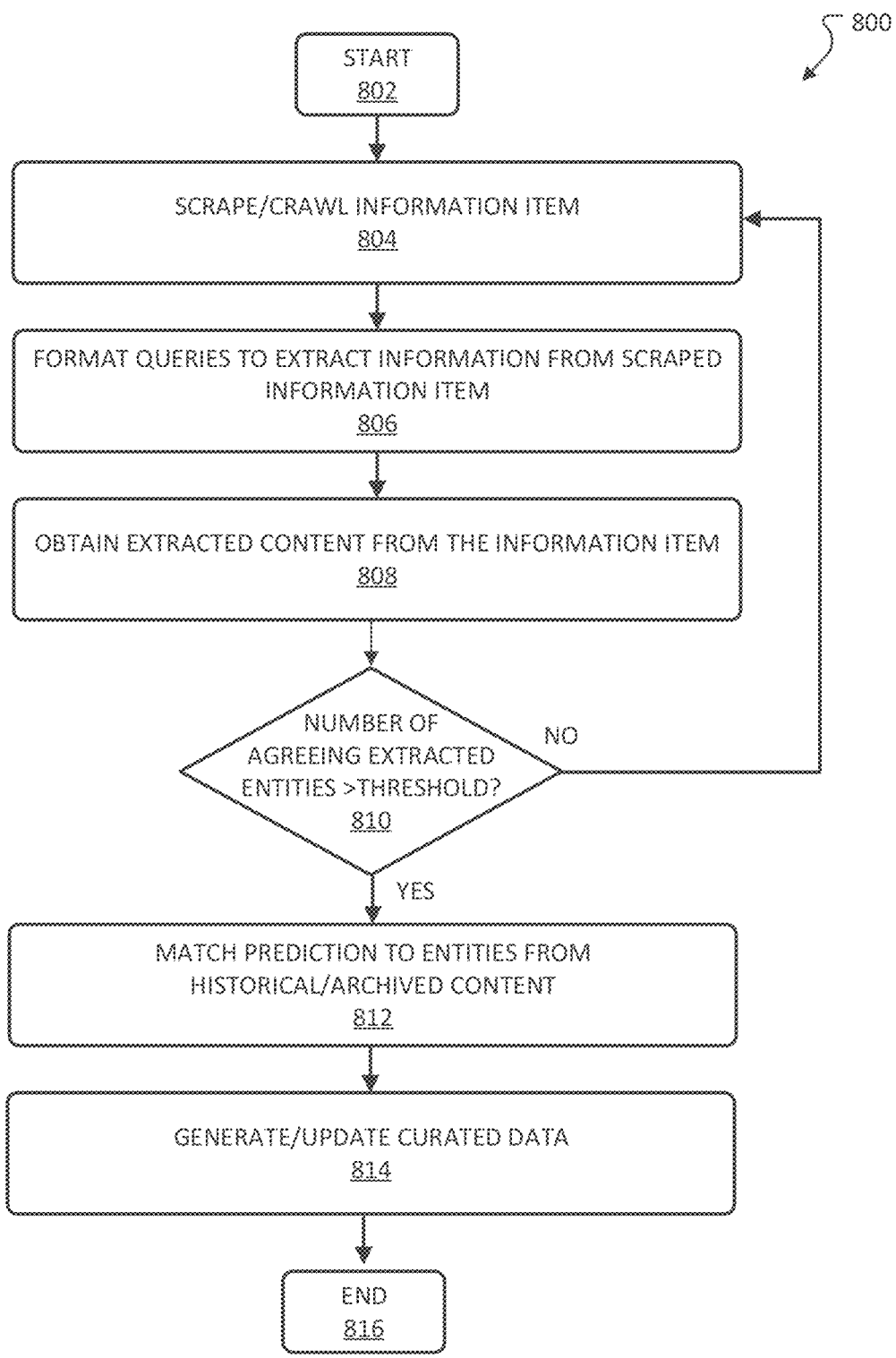
FIG. 8 illustrates an overview of an example method for obtaining extracted content from unstructured content in accordance with examples of the present disclosure.

FIG. 8 illustrates an overview of an example method 800 for obtaining extracted content from unstructured content in accordance with examples of the present disclosure. In examples, aspects of the method 800 are performed by one or more processing devices, such as a computer or server. The method 800 begins at operation 802, where information items, such as information items 204A-204D, associated with a plurality of data sources may be scraped, or crawled, by a content scraper at 804. The content scraper may be the same as or similar to content scrapers 208A-208D. In some examples, the method 800 may obtain questions as formatted queries that may serve as a basis for identifying or extracting content utilizing a machine learning model at 806. The formatted queries, may be provided to a machine learning model as a formatted request that is associated with or otherwise specific to one or more labeled entities associated with the trained model. For example, the formatted query may correspond to a keyword provided as training data to train the model. That is, the formatted query may request entity specific information, such as "who won an event?" Of course, other queries and information are contemplated.

The method 800 may proceed to 808 where the machine learning model may be used to obtain extracted content from the information item. For example, the machine learning model 216 may be used to obtain extracted content from an information item scraped at 804. The method 800 may then determine whether a number of agreeing or matching extracted entities are greater than a threshold at 810. In examples, the threshold may be three. Accordingly, if the same extracted entity, such as "Lumberjack," is extracted as a participant entity from three or more different information items, then the method 800 may proceed to match the extracted entity to information included in a archived content repository at 812. If the number of agreeing or matching extracted entities is not greater than the threshold, the method 800 may proceed back to 804.

Method 800 may proceed to 812, where the entities extracted may be matched to information in the archived content repository. Once matched, additional information from the archived content repository may be used to associate additional information with the extracted entity. For example, a birthdate associated with a participant may be located and included in a database of curated data. Accordingly, the method 800 may proceed to 814, where a curated data repository may be updated using the extracted information. Such information may then be provided to an indexing server or service such that a user searching for content can be provided with a rich content experience using data from a plurality of unstructured data sources. The method 800 may then end at 816.

Figure 9:
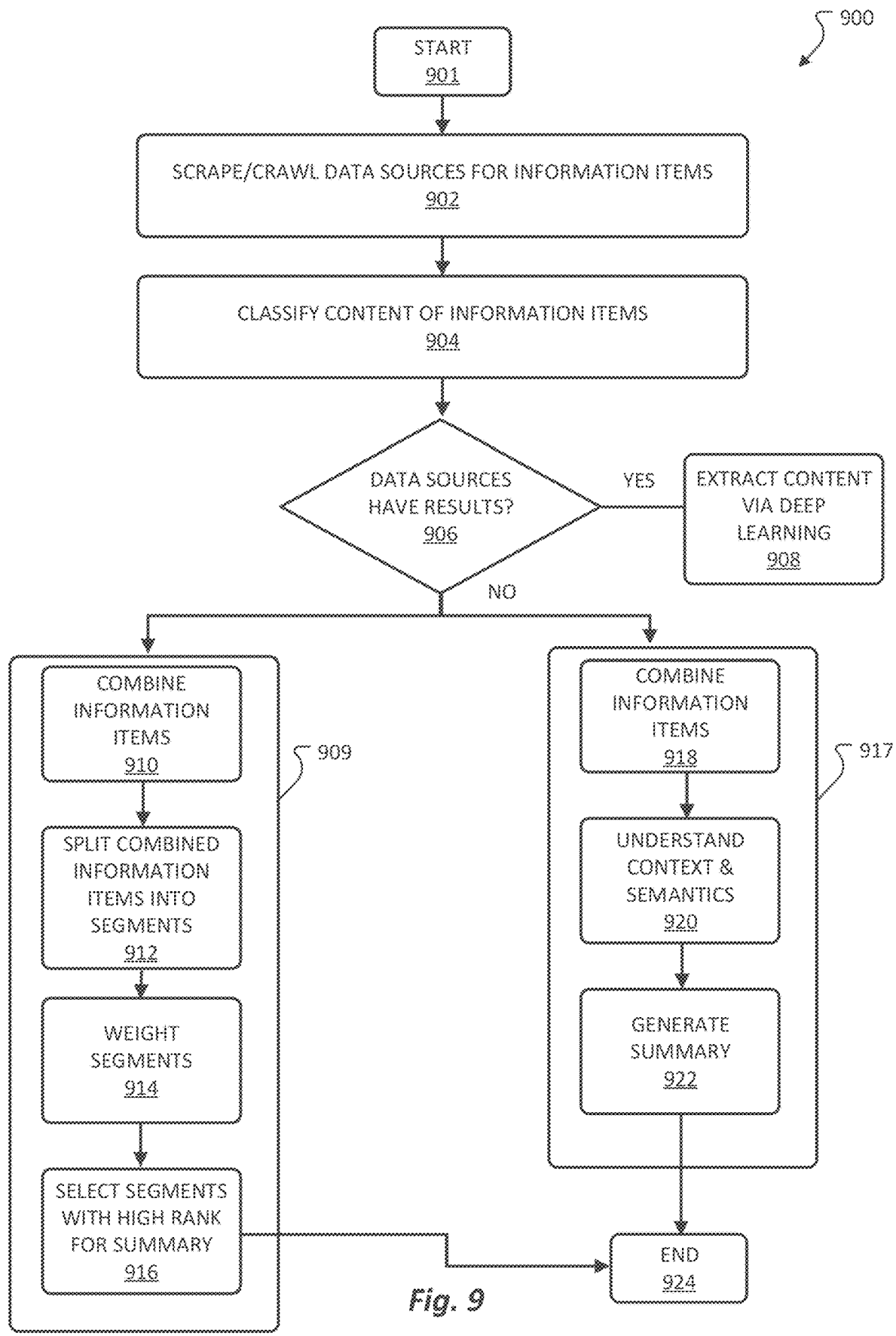
FIG. 9 illustrates an overview of an example method for generating summary content associated with unstructured content in accordance with examples of the present disclosure.

FIG. 9 illustrates an overview of an example method 900 for generating summary content associated with unstructured content in accordance with examples of the present disclosure. In some examples, a summary of the content received from the information items obtained via one or more content scrapers may be generated by the summarizer. In examples, aspects of the method 900 are performed by one or more processing devices, such as a computer or server or summarizer 240. The method 900 begins at operation 901 and proceeds to operation 902, where information items, such as information items 204A-204D, associated with a plurality of data sources may be scraped, or crawled, by a content scraper. The method 900 may then proceed to 904 to classify the content of the information items. The classification process may analyze the information item and determine, at 906, whether the information item includes a result; such determination may be based on whether the information item returns extracted content based on a formatted query in a question dataset and/or information from a specific formatted query. For example, the result may correspond to an outcome of an event. If the information item includes a result, the method 900 may proceed to 908, where content may be extracted (such as according to the method 800).

If the information item does not include a result, for example, the information item does not return a result based on a general or specific formatted query, the method may proceed to 909 and/or 917, where a summary may be obtained or generated. In one example, 909 may correspond to an extractive process whereby one or more of the information items may be combined at 910 and segmented at 912. The segmentation process at 912 may divide the combined article into a plurality of segments, where each segment may correspond to a phrase or sentence, for example. At 914, a similarity matrix may be utilized to determine similarities between segments; such segments may then be weighted and ranked according to the determined similarities. At 916, the segments having the greatest weight or otherwise highest ranking may be selected and assembled, thereby generating a summary. If an abstractive process is used to generate the summary, a summarizer, for example summarizer 420, may generate a summary from the information items. Accordingly, the information items may be combined at 918 such that context and semantics may be utilized to understand the information items at 920. Based on the context and semantics, a summary may be generated at 922. In examples, the extractive and abstractive processes may be performed by a machine learning model, such as a natural language processing model. In examples, the machine learning model may be the same as or similar to the machine learning model 216. Accordingly, the summaries generated by the method 900 may be added to a curated dataset and used to provide a rich content experience using data from a plurality of unstructured data sources.

Figure 10:
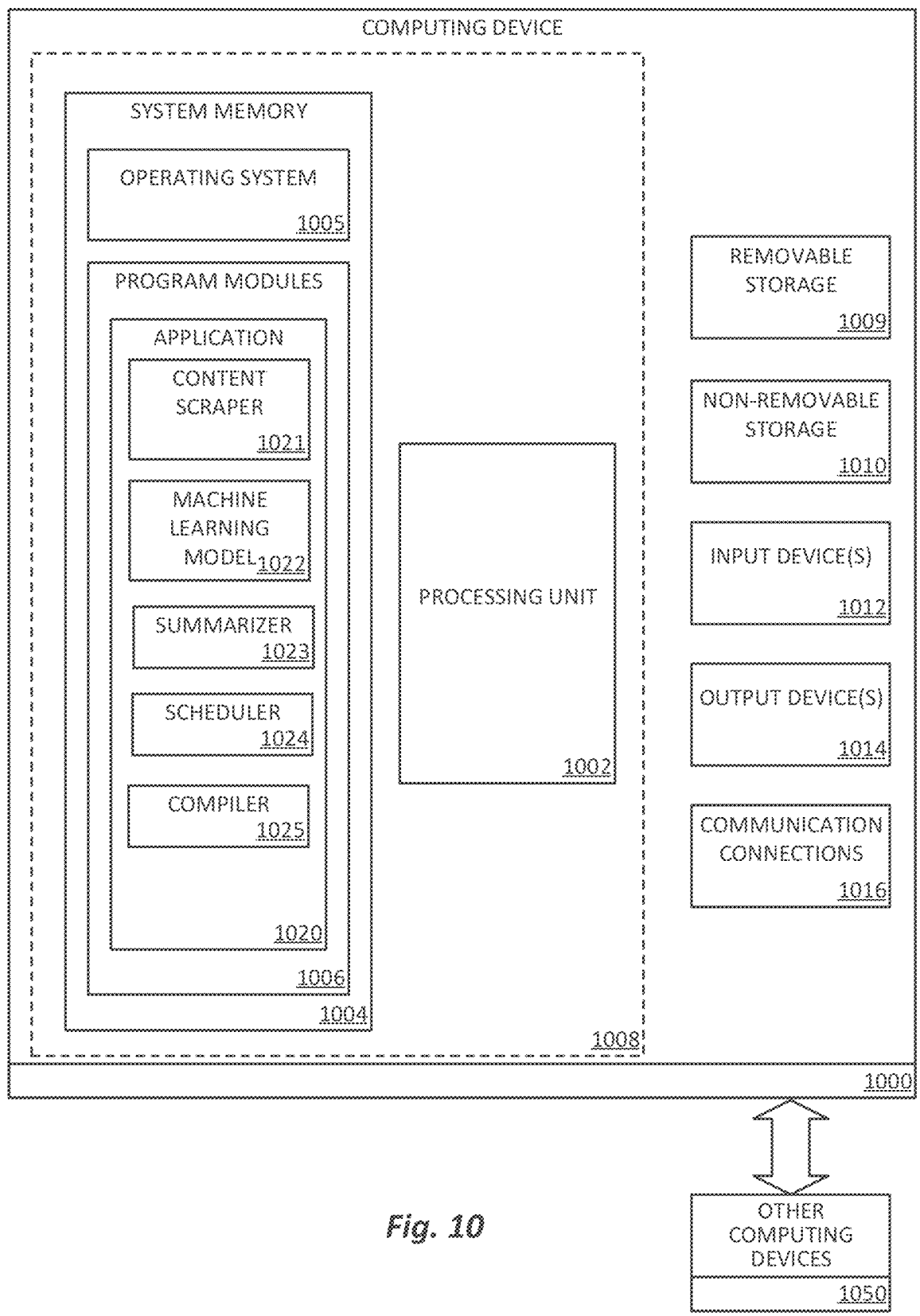
FIG. 10 is a block diagram illustrating physical components (e.g., hardware) of a computing device with which aspects of the disclosure may be practiced.

FIGS. 9-11 and the associated descriptions provide a discussion of a variety of operating environments in which aspects of the disclosure may be practiced. However, the devices and systems illustrated and discussed with respect to FIGS. 9-11 are for purposes of example and illustration and are not limiting of a vast number of computing device configurations that may be utilized for practicing aspects of the disclosure, described herein.

FIG. 10 is a block diagram illustrating physical components (e.g., hardware) of a computing system 1000 with which aspects of the disclosure may be practiced. The computing system components described below may be suitable for the computing and/or processing devices described above. The computing system 1000 may be distributed across multiple devices. For example, one or more components of the computing system 1000 may reside at a location other than another of the components of the computing system 1000. In a basic configuration, the computing system 1000 may include at least one processing unit 1002 and a system memory 1004. Depending on the configuration and type of computing system, the system memory 1004 may include, but is not limited to, volatile storage (e.g., random-access memory (RAM)), non-volatile storage (e.g., read-only memory (ROM)), flash memory, or any combination of such memories.

The system memory 1004 may include an operating system 1005 and one or more program modules 1006 suitable for running software application 1020, such as one or more components supported by the systems described herein. As examples, system memory 1004 may include the content scraper 1021, the machine learning model 1022, the summarizer 1023, the scheduler 1024, and/or the compiler 1025. The content scraper may be the same as or similar to the content scraper 208A as previously described. The machine learning model 1022 may be the same as or similar to the machine learning model 216 as previously described. The summarizer 1023 may be the same as or similar to the summarizer 240 as previously described. The scheduler 1024 may be the same as or similar to the schedulers 252 as previously described. The compiler 1025 may be the same as or similar to the compiler 236 previously described. The operating system 1005, for example, may be suitable for controlling the operation of the computing system 1000.

Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing system 1000 may have additional features or functionality. For example, the computing system 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., application 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing system 1000 may include one or more communication connections 1016 allowing communications with other computing systems 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 1000. Any such computer storage media may be part of the computing system 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
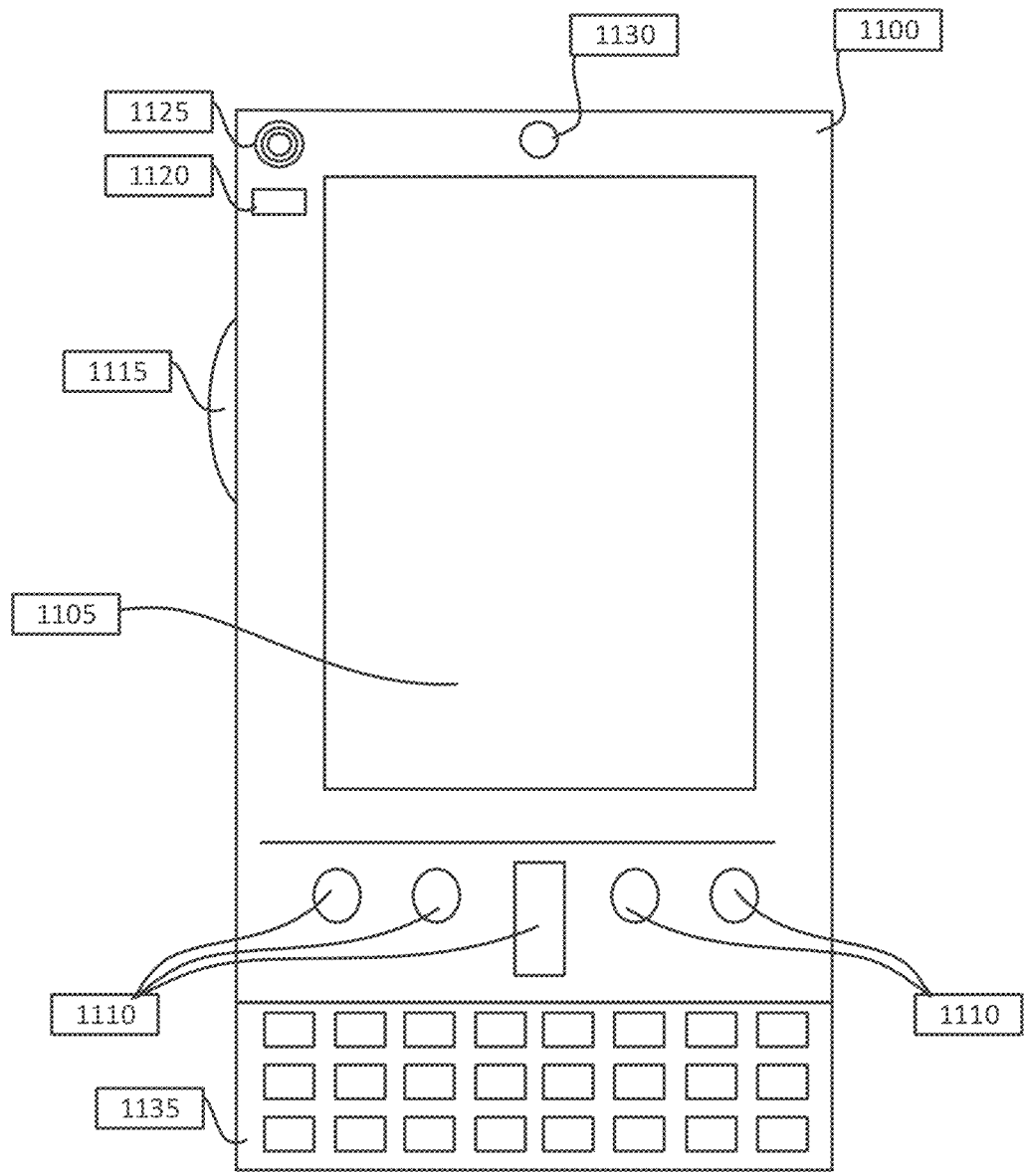
FIGS. 11A-11B illustrate a mobile computing device with which embodiments of the disclosure may be practiced.
Figure 11B:
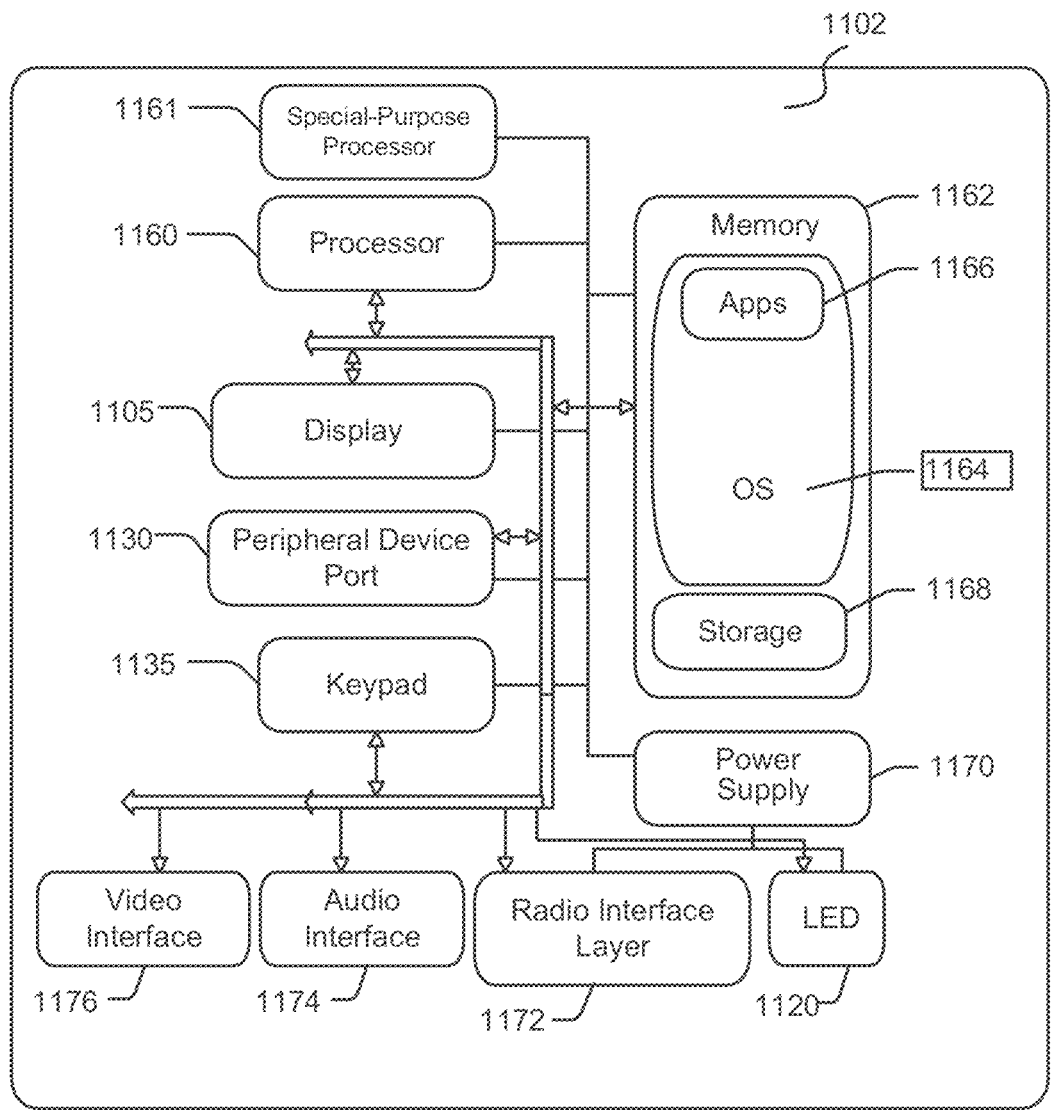

FIGS. 11A-11B illustrate a mobile computing device 1100, for example, a mobile telephone, a smart phone, wearable computer (such as a smart watch), a tablet computer, a laptop computer, and the like, with which embodiments of the disclosure may be practiced. In some respects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display).

If included, an optional side input element 1115 allows further user input. The side input element 1115 may be a rotary switch, a button, or any other type of manual input element. In alternative aspects, mobile computing device 1100 may incorporate greater or fewer input elements. For example, the display 1105 may not be a touch screen in some embodiments.

In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display.

In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g., search engine, extractor module, relevancy ranking module, answer scoring module, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated embodiment, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
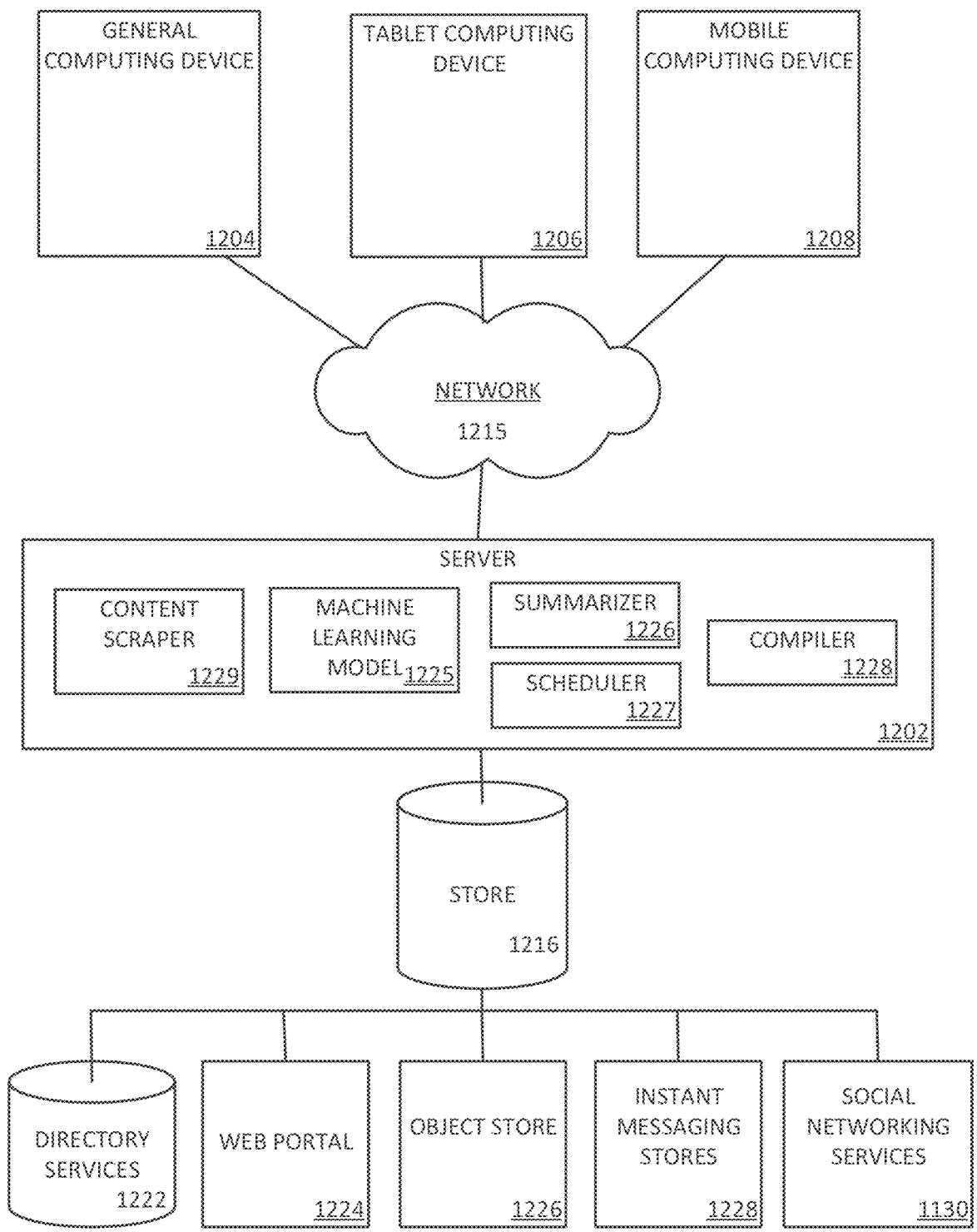
FIG. 12 illustrates one aspect of the architecture of a system for processing data.

FIG. 12 illustrates one aspect of the architecture of a system for processing data received at a computing system from a remote source, such as a personal computer 1204, tablet computing device 1206, or mobile computing device 1208, as described above. Content at a server system 1202 that includes one or more devices may be stored in different communication channels or other storage types. For example, various documents may be stored using a directory service 1222, a web portal 1224, a mailbox service 1226, an instant messaging store 1228, or a social networking site 1230.

One or more of the previously described program modules 1006 or software applications 1020 may be employed by server system 1202. For example, the server system 1202 may include a content scraper 1231 which may be the same as or similar to the content scraper 208A as previously described. The machine learning model 1232 may be the same as or similar to the machine learning model 216 as previously described. The summarizer 1233 may be the same as or similar to the summarizer 240 as previously described. The scheduler 1234 may be the same as or similar to the schedulers 252 as previously described. The compiler 1235 may be the same as or similar to the compiler 236 previously described.

The server system 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone). Any of these embodiments of the computing devices may obtain content from the store 1216, in addition to receiving graphical data useable to be either pre-processed at a graphic-originating system, or post-processed at a receiving computing system. The store 1216 may be the same as or otherwise similar to the curated data repository 242 and therefore the server system 1202 may provide a user interface, such as the user interface 268, to one or more of the personal computer 1204, tablet computing device 1206, and/or the mobile computing device 1208.

The present disclosure relates to systems and methods for generating structured event data from unstructured web content according to at least the examples provided in the sections below:

(A1) In one aspect, some embodiments include a method for identifying entities within unstructured data. The method includes obtaining a plurality of information items 204 from a plurality of data sources 201, each information item 204 including unstructured content; providing the plurality of information items 204 to a trained machine learning model 220, wherein the model 220 is trained with training data that includes information items and corresponding labeled entities for a plurality of historical events; receiving a formatted request 413, where the formatted request 413 is associated with one or more labeled entities 417 associated with the trained machine learning model; identifying, by the trained machine learning model 220, multiple entities 224 from the unstructured content based on the formatted request 413 associated with the one or more labeled entities 417; storing each identified entity 224 of the identified multiple entities as structured content responsive to the formatted request 413 when a number of matching identified entities for each identified entity of the identified multiple entities exceeds a threshold 810.

(A2) In some embodiments of A1, an information item 204 of the plurality of information items is a text article 204A and a data source 201A is a first website 201

(A3) In some embodiments of A2, the method includes causing a textual representation of each identified entity 224 to be displayed at a second website 268.

(A4) In some embodiments of A1-A3, the method further includes combining a second plurality of information items 204 associated with an identified entity of the multiple identified entities into a summary information item 239; and generating 816/822 a summary 241 describing the second plurality of information items 204 from the summary information item 239.

(A5) In some embodiments of A4, the method further includes splitting the summary information item into a plurality of text segments 239; assigning a weight to each text segment; selecting a plurality of text segments having a weight greater than a threshold; and assembling the plurality of text segments to generate the summary describing the information.

(A6) In some embodiments of A1-A5, the method further includes identifying structured content from an archived content repository 232 based on at least one identified entity; and associating the structured content with the identified entity.

(A7) In some embodiments of A6, the method further includes providing the at least one identified entity and the identified structured content to a user interface generator 112, where the user interface generator 112 is configured to generate a user interface 116 for display to a requesting entity 256.

(A8) In some embodiments of A1-A7, the method further includes presenting the structured content to a user in response to a search query 616.

(A9) In some embodiments of A1-A8, the event is at least one of a sporting event, e-sports event, and musical event.

(A10) In some embodiments of A1-A9, a first information item 204A of the plurality of information items is a text article and a second information item 204B of the plurality of information items is a social media post.

(A11) In some embodiments of A1-A10, each identified entity is not stored when a number of matching identified entities for each identified entity of the identified multiple entities has less than the threshold number of matches.

In yet another aspect, some embodiments include a computing system including one or more processors and memory coupled to the one or more processors, the memory storing one or more programs configured to be executed by the one or more processors, the one or more programs including instructions for performing any of the methods described herein (e.g., A1-A11 described above).

In yet another aspect, some embodiments include a non-transitory computer-readable storage medium storing one or more programs for execution by one or more processors of a storage device, the one or more programs including instructions for performing any of the methods described herein (e.g., A1-A11 described above).

(B1) In one aspect, some embodiments include a method for training a machine learning model. The method includes receiving a request from a requesting entity 256 to train a machine learning model 332 to extract relevant information from unstructured content 320; identifying a plurality of keywords from a plurality of information items 304 including unstructured content 320; associating a formatted request for one or more entities with the plurality of keywords; training the machine learning model 332 with the plurality of keywords and the formatted request; and providing the trained machine learning model 336 to the requesting entity 256.

(B2) In some embodiments of B1, the unstructured content 320 is an article 320 including unstructured text.

In yet another aspect, some embodiments include a computing system including one or more processors and memory coupled to the one or more processors, the memory storing one or more programs configured to be executed by the one or more processors, the one or more programs including instructions for performing any of the methods described herein (e.g., B1 -B2) described above).

In yet another aspect, some embodiments include a non-transitory computer-readable storage medium storing one or more programs for execution by one or more processors of a storage device, the one or more programs including instructions for performing any of the methods described herein (e.g., B1-B2 described above).

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating structured content for an event, comprising:
   obtaining a plurality of information items from a plurality of data sources, each information item including unstructured content about the event;
   providing the plurality of information items to a trained machine learning model, wherein the model is trained with training data that includes information items and corresponding labeled entities for a plurality of historical events;
   receiving a formatted request, wherein the formatted request is associated with one or more labeled entities associated with the trained machine learning model;
   identifying, by the trained machine learning model, multiple entities from the unstructured content based on the formatted request associated with the one or more labeled entities;
   combining the plurality of information items associated with an identified entity of the multiple identified entities into a summary information item;
   splitting the summary information item into a plurality of text segments;
   assembling one or more text segments of the plurality of text segments to generate a summary of the plurality of information items associated with the identified entity;
   storing each identified entity of the identified multiple entities and the generated summary as structured content responsive to the formatted request when a number of matching identified entities for each identified entity of the identified multiple entities exceeds a threshold; and
   including the structured content in a search index.

2. The method of claim 1, wherein an information item of the plurality of information items is a text article and a data source of the plurality of data sources is a first website.

3. The method of claim 2, further comprising causing a textual representation of each identified entity to be displayed at a second website.

4. The method of claim 1, further comprising:
   identifying structured content from an archived content repository based on at least one identified entity; and
   associating the structured content with the identified entity.

5. The method of claim 4, further comprising providing the at least one identified entity and the identified structured content to a user interface generator, wherein the user interface generator is configured to generate a user interface for display to a requesting entity.

6. The method of claim 1, further comprising presenting the structured content to a user in response to a search query.

7. The method of claim 1, wherein the event is at least one of a sporting event, e-sports event, and musical event.

8. The method of claim 1, wherein a first information item of the plurality of information items is a text article and a second information item of the plurality of information items is a social media post.

9. The method of claim 1, wherein assembling the one or more text segments comprises:
   assigning a weight to each text segment of the plurality of text segments, wherein the weight is based on a similarity of each text segment to the plurality of text segments;
   selecting the one or more text segments having a weight greater than a threshold; and
   assembling the one or more weighted text segments to generate the summary of the plurality of information items associated with the identified entity.

10. A system comprising:
    a processor; and
    memory, the memory including instruction which when executed by the processor, causes the processor to:
       obtain a plurality of information items from a plurality of data sources, each information item including unstructured content;
       provide the information item to a trained machine learning model, wherein the model is trained with training data that includes information items and corresponding labeled entities for a plurality of historical entities;
       receive a formatted request, wherein the formatted request is associated with one or more labeled entities associated with trained machine learning model;
       identify, by the trained machine learning model, multiple entities from the unstructured content based on the formatted request associated with the one or more labeled entities;
       combine the plurality of information items associated with an identified entity of the multiple identified entities into a summary information item;
       split the summary information item into a plurality of text segments;
       assemble one or more text segments of the plurality of text segments to generate a summary of the plurality of information items associated with the identified entity; and store each identified entity of the identified multiple entities and the generated summary as structured content responsive to the formatted request when a number of matching identified entities for each identified entity of the identified multiple entities exceeds a threshold.

11. The system of claim 10, wherein a first information item is a text article and a first data source is a first website.

12. The system of claim 11, wherein the instructions cause the processor to generate a textual representation of at least one identified entity to be displayed at a second website.

13. The system of claim 10, wherein the instructions cause the processor to forgo storing each identified entity when a number of matching identified entities for each identified entity of the identified multiple entities has less than the threshold number of matches.

14. The system of claim 10, wherein the instructions cause the processor to:
include the structured content in a search index.

15. The system of claim 10, wherein the instructions cause the processor to:
combine a second plurality of information items associated with an identified entity of the multiple identified entities into a summary information item; and
generate a summary describing the second plurality of information items from the summary information item.

16. The system of claim 10, wherein the instructions cause the processor to present the structured content to a user in response to a search query.

17. The system of claim 10, wherein a first information item of the plurality of information items is a text article and a second information item of the plurality of information items is a social media post.

18. A method for generating structured content for an event, comprising:
obtaining a plurality of information items from a plurality of data sources, each information item including unstructured content about the event;
providing the plurality of information items to a trained machine learning model, wherein the model is trained with training data that includes information items and corresponding labeled entities for a plurality of historical events;
receiving a formatted request, wherein the formatted request is associated with one or more labeled entities associated with the trained machine learning model;
identifying, by the trained machine learning model, multiple entities from the unstructured content based on the formatted request associated with the one or more labeled entities;
combining the plurality of information items associated with an identified entity of the multiple identified entities into a summary information item;
analyzing the summary information item for context and semantics;
generating, based on the context and semantics of the summary information item, a summary of the plurality of information items associated with the identified entity;
storing each identified entity of the identified multiple entities and the generated summary of the plurality of information items as structured content responsive to the formatted request when a number of matching identified entities for each identified entity of the identified multiple entities exceeds a threshold; and
including the structured content in a search index.

* * * * *